Patented Sept. 7, 1926.

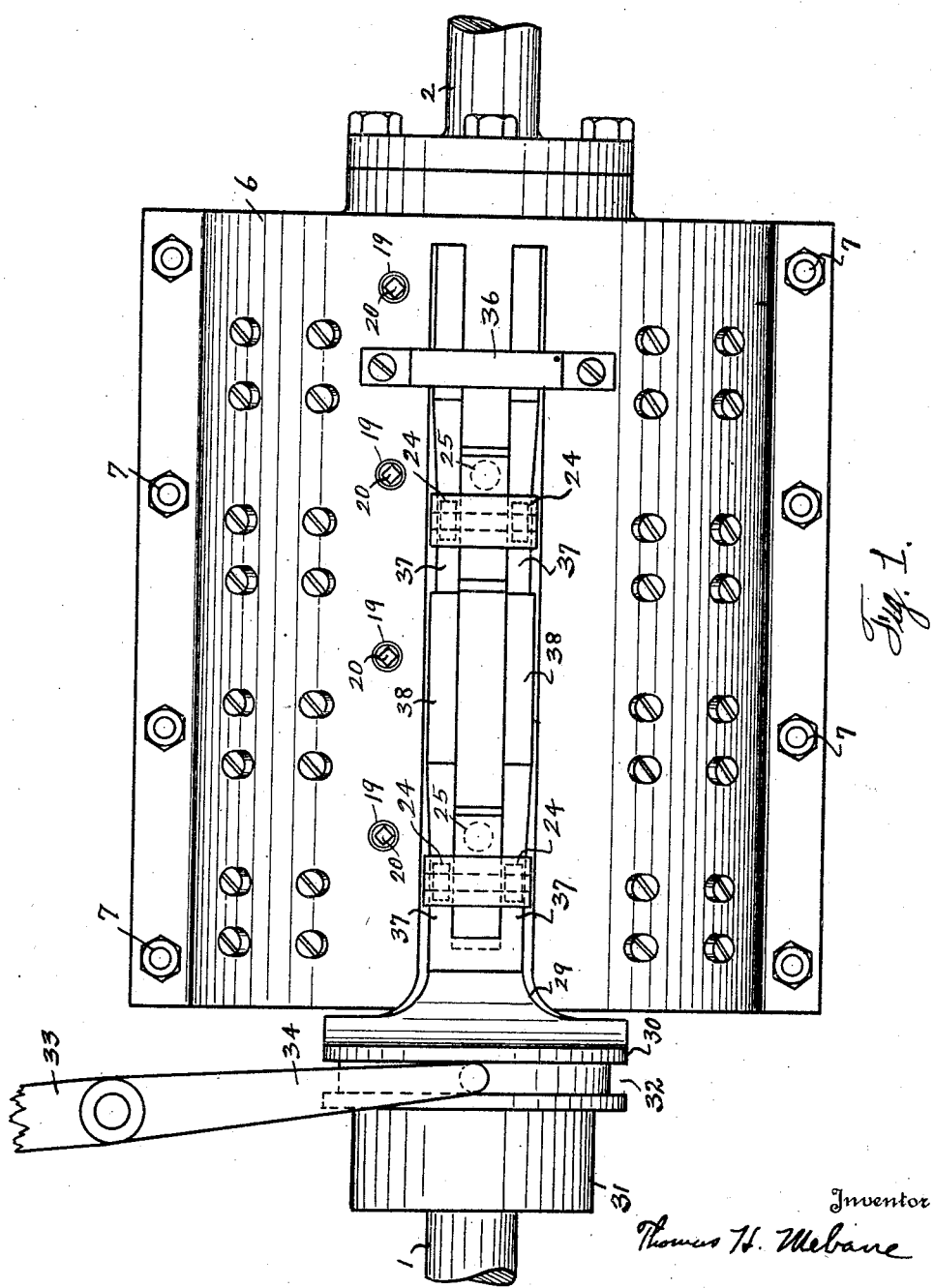

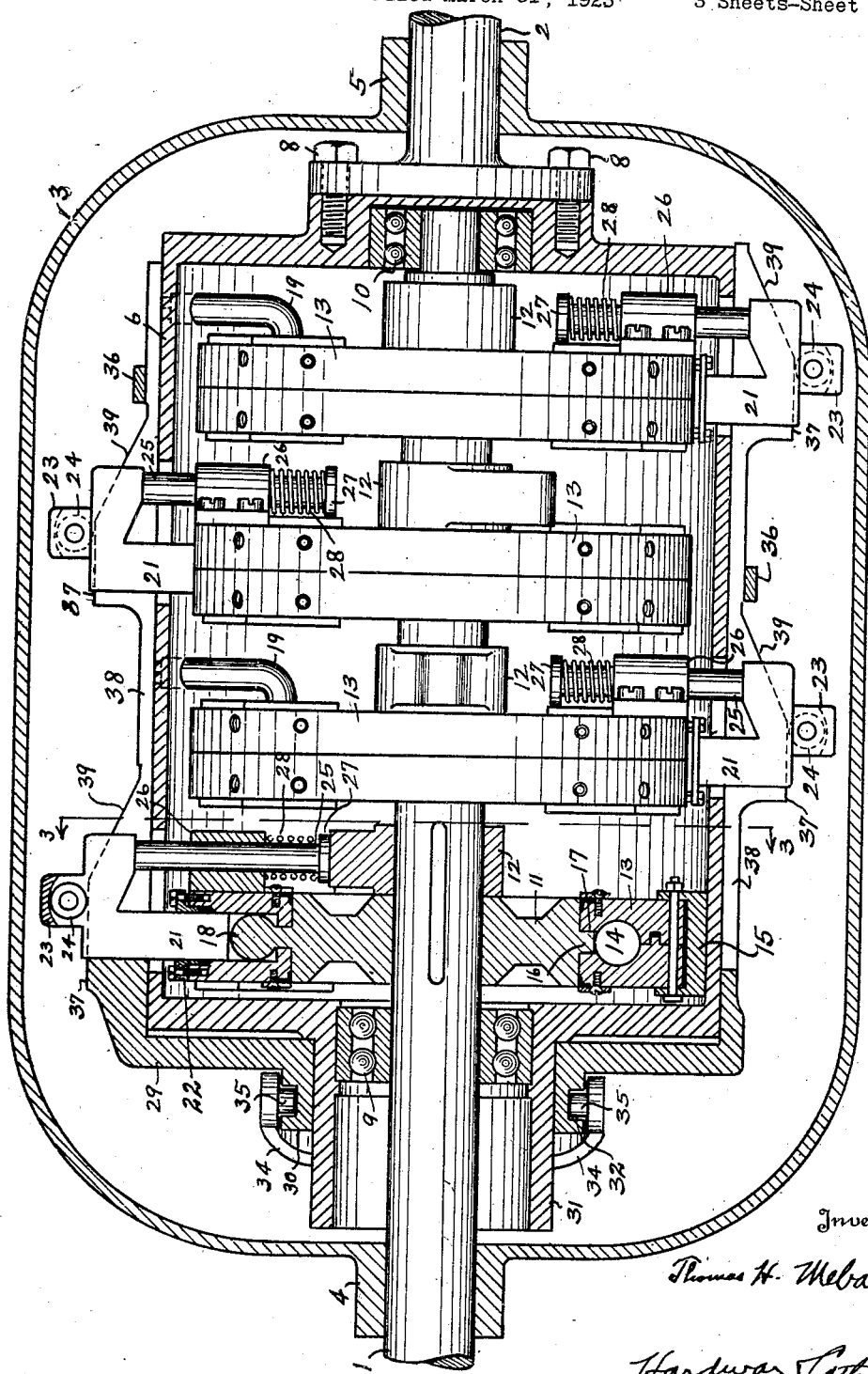

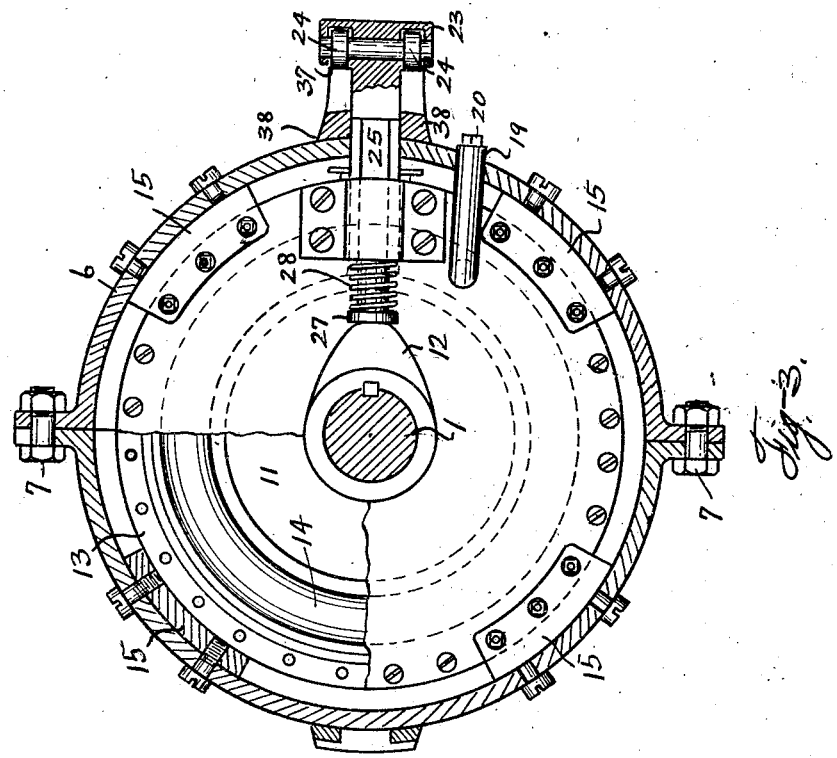
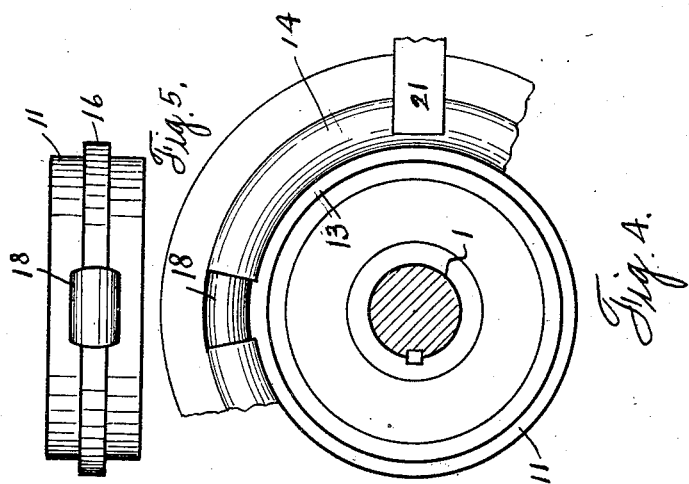

1,599,181

UNITED STATES PATENT OFFICE.

THOMAS H. MEBANE, OF HOUSTON, TEXAS.

TRANSMISSION MECHANISM.

Application filed March 31, 1923. Serial No. 628,989.

This invention relates to new and useful improvements in a transmission mechanism.

One object of the invention is to provide a mechanism of the character described through which power may be delivered from a driving to a driven member.

Another object of the invention is to provide a transmission mechanism of the character described for delivering power from a driving to a driven member through the medium of fluid under compression.

A still further feature of the invention resides in the provision of a transmission mechanism embodying means for utilizing fluid under compression as a driving medium in such a manner that the rotation of the driven member may be varied with respect to the rotation of the driving member.

Another object of the invention resides in the provision of a transmission mechanism which, under certain conditions, may be utilized as a brake to retard or stop the rotation of the driven member.

With the above and other objects in view the invention has particular relation to certain novel features of construction, operation and arrangement of parts, an example of which is given in this specification and illustrated in the accompanying drawings, wherein :—

Figure 1 is a side view of the device.

Figure 2 is a horizontal sectional view.

Figure 3 is a vertical sectional view taken on the line 3—3 of Figure 2.

Figure 4 is a fragmentary vertical sectional view showing, in elevation, one of the driving dics employed and, Figure 5 is a plan view of said disc.

In the drawings the numeral 1 designates a driving shaft, and the numeral 2 designates a driven shaft. The entire mechanism is enclosed by a suitable housing 3 formed with end bearings 4 and 5, in which the respective shafts rotate. The numeral 6 designates a transmission case which is preferably formed of two sections formed with oppositely disposed outwardly turned flanges secured together by bolts as 7. The driven shaft 2 is secured to the case by means of set bolts as 8 or in some other suitable manner, and the respective ends of the transmission case are provided with suitable antifriction bearings 9 and 10 for the driving shaft 1. Splined upon said driving shaft there is a plurality of driving discs as 11 spaced a suitable distance apart and adjacent these discs 11 and splined upon said shaft there are the cams 12 arranged ninety degrees apart around the shaft. Secured to the inner wall of the case 6, and surrounding the respective driving discs 11, are the sectional channels 13 forming between them an enclosed annular chamber 14, preferably circular in cross section. These channels are seated in the channel-like seats 15 which are bolted to the inner wall of the transmission case 6, as shown more accurately in Figure 3, and the members of the sectional channels 13 are bolted or otherwise secured together, as shown in Figures 2 and 3. The periphery of each disc 11 has a central rib 16 which runs in an internal annular groove 17 in each channel, and each disc also has a head 18 which is circular in cross section and which runs in, and blocks the corresponding chamber 14 of the adjacent channel 13. The chambers 14 are filled with oil through the respective inlet pipes 19 whose outer ends are normally closed by means of screw plugs 20, as shown in Figures 1 and 3. The heads 18 of the respective driving discs 11 are aligned with the adjacent cams 12.

Provision is made for partly or completely blocking the chambers 14 by means of valves 21, said valves working through suitable stuffing boxes as 22, provided in the respective channels 13. The outer end of each valve is formed with a hood 23 in which is enclosed the roller bearings 24, 24 and the valves also have inwardly extending stems 25 which work through the case 6 and through suitable bearings as 26, which are bolted to the sides of the channels 13. The inner ends of these stems are formed with heads as 27, aligned with the corresponding cams 12, and interposed between said heads and the bearings 26, and surrounding said stems are the coil springs 28, said springs normally tending to hold the valves in their inward position so as to block the chambers 14. There is a yoke 29 formed with an annular collar 30, said collar surrounding the sleeve 31 into which the end of the case 6, opposite the driven shaft 2, is formed. The collar 30 is formed with an annular groove 32, and is shifted back and forth through the instrumentality of the lever 33 which is bifurcated forming the fingers 34, 34 which embrace said collar and whose free ends have the inwardly turned studs 35, 35 which work in the groove 32. The yoke 29 is of a substantially U-shaped form and works on opposite sides of the case 6, as shown in Figures 1, 2 and 3 and its arms are bifurcated so as to embrace the valves on each side and the free ends of said arms work through suitable brackets 36, 36 by means of which they are retained in place. These bifurcated arms form tracks for the respective rollers 24, and the valves are controlled by adjusting said tracks through the lever 33.

When the valves are in open or outward position the driving shaft 1 will rotate without transmitting rotation to the driven member for the reason that the heads 18 will encounter no resistance. In this position the anti-friction rollers 24 will rest upon the cam faces 37 of said bifurcated arms 38 thus holding said valves in outward position and holding the springs 28 under compression. The lever 33 may now be actuated to move the yoke 29 outwardly on the sleeve 31, and as said yoke is moved outwardly the arms 38 will be correspondingly moved bringing the declining faces 39 underneath the rollers 24, and permitting the valves to move inwardly under the influence of the springs 28 and thus gradually partially blocking the chambers 14 and offering resistance, through the fluid in said chambers to the heads 18 and thereby imparting rotation from the driving shaft 1 to the transmission case 6, and the driven shaft 2 connected thereto. The lever 33 may be moved further to permit the complete closing of said valves so that they will completely block said chambers and the driven shaft will then rotate simultaneously with the driving shaft. A fluid cushion is thus provided between the driving and driven members thus minimizing the jar and shock incident to change of speed.

When the valves 21 are only partly closed the speed of the driven member will be slower than that of the driving member, the heads or abutments 18 moving around the chambers 14 but at a much slower relative rate of speed than when the valves are completely open. In order to permit these heads or abutments 18 to pass the valves, when the valves are partly closed, the cams 12 have been provided, said cams being in alignment with the corresponding abutments 18 and operating against the stems 25 to lift the valves to permit the abutments to clear. The abutments being arranged approximately ninety degrees apart, on a plane cutting the axis of the driving and driven members at a right angle, the abutments pass their respective valves one at a time so that the driving connection between the driving and driven members is not affected as said valves open one at a time for the purpose stated.

In case the motor is suddenly slowed down thus slowing the rotation of the driving shaft, it is obvious that the transmission will act as a brake inasmuch as the driven shaft can not rotate faster than the driving shaft when the valves are completely closed.

A very flexible and noiseless transmission mechanism is thus provided permitting a wide range of speeds from starting position to a direct drive from the driving to the driven shaft.

What I claim is:—

1. A transmission mechanism including a housing formed with end bearings, a driving and a driven shaft rotatably mounted in the respective bearings, a transmission case within the housing and secured to one of said shafts, said transmission case being formed with a bearing in which the other shaft works, a plurality of driving discs spaced apart and secured on the last mentioned shaft and cams secured on said shaft adjacent the respective discs, channels secured to the wall of the case in alignment with the respective discs and provided with internal annular chambers, an abutment secured to each disc and running in the corresponding chamber, a valve adapted to close each chamber, an inwardly extending stem attached to the outer end of each valve and whose free ends are aligned with the corresponding cams, yieldable members arranged to actuate the respective valves into position to block the corresponding chambers and manual means through which the valves may be actuated into withdrawn position to unblock said chambers.

2. A transmission mechanism including a transmission case, a shaft to which said case is secured, a shaft rotatable in a bearing carried by said case, a plurality of driving discs spaced apart and secured on said last named shaft within said case and cams secured on said shaft adjacent the respective discs, annular members secured to the walls of said case in alignment with the respective discs and each being provided with an internal annular chamber, an abutment carried by each disc and running in the corresponding chamber, a valve adapted to block each chamber, means connected to each valve and disposed to be actuated by the corresponding cam to move the corresponding valve into position to unblock its chamber, yieldable members normally operating through said corresponding means to hold the valves seated to block their corresponding chambers and manual means through which the valves may be simultaneously actuated.

In testimony whereof I have signed my name to this specification.

THOMAS H. MEBANE.